(12) United States Patent
Kondos et al.

(10) Patent No.: US 11,945,899 B2
(45) Date of Patent: Apr. 2, 2024

(54) MOISTURE-CURABLE SILYLATED RESIN DERIVED FROM POLYCARBONATE DIOL AND COATING, SEALANT AND ADHESIVE COMPOSITIONS CONTAINING SAME

(71) Applicant: Momentive Performance Materials Inc., Waterford, NY (US)

(72) Inventors: Constantine Kondos, White Plains, NY (US); Nayeem Soad, Paterson, NJ (US); Misty Huang, New City, NY (US); Christine Lacroix, Ornex (FR); Vikram Kumar, Tarrytown, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 16/707,061

(22) Filed: Dec. 9, 2019

(65) Prior Publication Data

US 2020/0109230 A1 Apr. 9, 2020

Related U.S. Application Data

(62) Division of application No. 15/454,504, filed on Mar. 9, 2017, now Pat. No. 10,538,612.

(60) Provisional application No. 62/306,243, filed on Mar. 10, 2016.

(51) Int. Cl.
| | |
|---|---|
| C08G 18/28 | (2006.01) |
| C08G 18/10 | (2006.01) |
| C08G 18/12 | (2006.01) |
| C08G 18/32 | (2006.01) |
| C08G 18/44 | (2006.01) |
| C08G 18/66 | (2006.01) |
| C08G 18/71 | (2006.01) |
| C08G 18/75 | (2006.01) |
| C08G 64/02 | (2006.01) |
| C09D 169/00 | (2006.01) |
| C09D 175/04 | (2006.01) |
| C09J 169/00 | (2006.01) |
| C08K 3/22 | (2006.01) |

(52) U.S. Cl.
CPC ........... *C08G 18/289* (2013.01); *C08G 18/10* (2013.01); *C08G 18/12* (2013.01); *C08G 18/3206* (2013.01); *C08G 18/44* (2013.01); *C08G 18/6644* (2013.01); *C08G 18/718* (2013.01); *C08G 18/755* (2013.01); *C08G 18/758* (2013.01); *C08G 64/0241* (2013.01); *C08G 64/0266* (2013.01); *C09D 169/00* (2013.01); *C09D 175/04* (2013.01); *C09J 169/00* (2013.01); *C08K 3/22* (2013.01); *C08K 2003/2241* (2013.01)

(58) Field of Classification Search
None
See application file for complete search history.

(56) References Cited

U.S. PATENT DOCUMENTS

| | | | |
|---|---|---|---|
| 5,100,999 A | 3/1992 | Murai et al. | |
| 6,492,482 B2 | 12/2002 | Lomoelder et al. | |
| 6,605,347 B2 | 8/2003 | Amano et al. | |
| 6,855,795 B2 | 2/2005 | Clements et al. | |
| 6,881,856 B2 | 4/2005 | Tanaka et al. | |
| 6,987,160 B2 | 1/2006 | Tanaka et al. | |
| 7,138,479 B2 | 11/2006 | Dhara et al. | |
| 8,410,205 B2* | 4/2013 | Saliya | C09D 7/42 524/377 |
| 8,552,109 B2 | 10/2013 | Nakamura et al. | |
| 8,637,157 B2 | 1/2014 | Hilgers et al. | |
| 8,859,634 B2 | 10/2014 | Sakata et al. | |
| 8,912,280 B2 | 12/2014 | Morikami et al. | |
| 8,937,141 B2 | 1/2015 | Sumi et al. | |
| 8,940,397 B2 | 1/2015 | Mallesha et al. | |
| 8,993,673 B2 | 3/2015 | Kitagawa et al. | |
| 9,018,334 B2 | 4/2015 | Montgomery et al. | |
| 9,018,340 B2 | 4/2015 | Takeda et al. | |
| 2004/0068060 A1* | 4/2004 | Ohrbom | C09D 163/00 525/523 |
| 2008/0090090 A1 | 4/2008 | Munster et al. | |
| 2009/0159204 A1* | 6/2009 | Burckhardt | C09K 3/1021 156/331.1 |
| 2012/0016100 A1 | 1/2012 | Miyake et al. | |
| 2012/0130002 A1* | 5/2012 | Schall | C08G 18/2063 524/507 |
| 2012/0196967 A1 | 8/2012 | Iwao et al. | |
| 2014/0221549 A1* | 8/2014 | Webster | C08G 77/458 525/450 |
| 2014/0272425 A1 | 9/2014 | Tamogami | |
| 2014/0295181 A1 | 10/2014 | Minomo et al. | |
| 2015/0031806 A1 | 1/2015 | Lim et al. | |
| 2015/0119497 A1 | 4/2015 | Matsui et al. | |
| 2015/0284499 A1 | 10/2015 | Kocher et al. | |

FOREIGN PATENT DOCUMENTS

| | | |
|---|---|---|
| EP | 0545108 A1 | 6/1993 |
| EP | 2725044 A1 | 4/2014 |
| GB | 2479075 A | 9/2011 |

(Continued)

OTHER PUBLICATIONS

"Conversion coating", Wikipedia.org., printed Sep. 4, 2015.

(Continued)

*Primary Examiner* — Tae H Yoon
(74) *Attorney, Agent, or Firm* — James C. Abruzzo

(57) ABSTRACT

A moisture-curable silylated resin is derived from a copolycarbonate diol prepared from diol(s) of specific types.

11 Claims, No Drawings

(56) References Cited

FOREIGN PATENT DOCUMENTS

| WO | 2007119305 A1 | 10/2007 |
| WO | WO 2010/110784 A1 * | 9/2010 |
| WO | WO 2013/003051 A2 * | 1/2013 |

OTHER PUBLICATIONS

"Passivation (chemistry)", Wikipedia.org., printed Sep. 4, 2015, pp. 1-7.
High Performance for your polyurethanes; Polycarbonatediols Eternacol; UBE Technical Guide; Mar. 9, 2011.
Eternacoll PH200D UBE Datasheet; adhesives.specialchem.com; printed May 19, 2015.
Features and Typical Benefits of SUPR* Prepolymer Technolgy; Silquest* A-Link* 15 silane, p. 2-3.
International Search Report and Written Opinion from PCT/US2017/021568 dated Jun. 1, 2017; May 20, 2015.

* cited by examiner

MOISTURE-CURABLE SILYLATED RESIN DERIVED FROM POLYCARBONATE DIOL AND COATING, SEALANT AND ADHESIVE COMPOSITIONS CONTAINING SAME

This application is a divisional application of U.S. patent application Ser. No. 15/454,504, filed Mar. 9, 2017, now U.S. Pat. No. 10,538,612; which claims priority to U.S. Provisional Patent Application No.: 62/306,243, filed Mar. 10, 2016, the entire contents of each of which is incorporated herein by reference in their entireties.

FIELD OF THE INVENTION

The present invention relates to silylated resins and, more particularly, to moisture-curable silylated resins derived from polycarbonate diols and to coating, sealant and adhesive compositions containing such resins.

BACKGROUND OF THE INVENTION

Moisture-curable silylated resins including those obtained from the silylation of polyurethanes derived from polycarbonate diols and polyisocyanates are known and are valued for the functional properties they confer on coating, sealant and adhesive compositions containing them.

However, known moisture-curable silylated resins, including those of the aforementioned silylated polycarbonate diol-based polyurethane type, may fail to perform acceptably in a given coating, sealant or adhesive composition, either during the application of these products and/or in their post-cured properties. For example, and as discovered herein, a moisture-cured silylated polyurethane resin derived from a representative commercially available polycarbonate diol made from a single acyclic aliphatic diol has been found to exhibit performance characteristics that at best are marginal or mediocre and at worst are deficient and unacceptable where high quality coatings, sealants and adhesives are concerned. The overall poor performance characteristics of the moisture-cured resin are believed to be attributable to the polycarbonate diols from which the resin is made.

SUMMARY OF THE INVENTION

In accordance with one aspect of the invention, there is provided a moisture-curable silylated resin of the general formula (I):

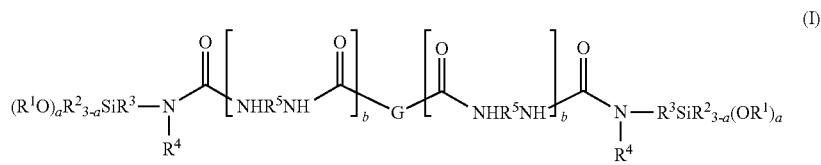

wherein:
G is a moiety of general structure (II):

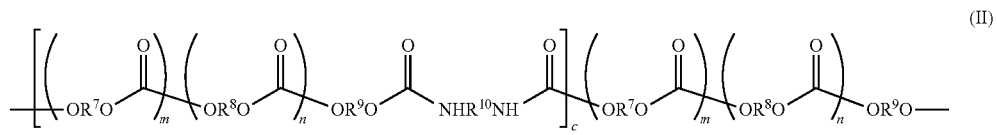

in which
each $R^1$ is independently an alkyl group of from 1 to 6 carbon atoms;
each $R^2$ is independently an alkyl group of from 1 to 4 carbon atoms or phenyl group;
each $R^3$ is independently an alkylene group of from 1 to 12 carbon atoms;
each $R^4$ is independently an alkyl group of from 1 to 6 carbon atoms, phenyl group, hydrogen or —$R^3SiR^2{}_{3-a}(OR^1)_a$ group;
each $R^5$ is independently a divalent organic group selected from the group consisting of an alkylene group having 1 to 16 carbon atoms, a cycloalkylene group having 5 to 16 carbon atoms and the group $X^1$ having the general formula (III):

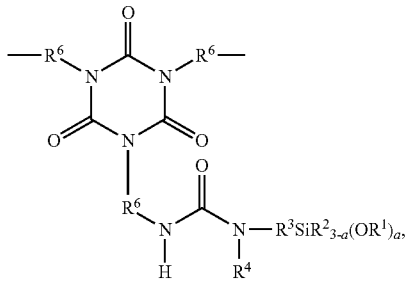

(III)

each $R^6$ is independently an alkylene group of from 1 to 12 carbon atoms or a cycloalkylene group of from 5 to 16 carbon atoms;
each $R^7$ is an alkylene group of from 2 to 12 carbon atoms;
each $R^8$ is an alkylene group of from 2 to 12 carbon atoms;
each $R^9$ is independently $R^7$ or $R^8$;
each $R^{10}$ is independently a divalent organic group selected from the group consisting of an alkylene group of from 1 to 12 carbon atoms, a cycloalkylene group of from 5 to 16 carbon atoms, $X^1$ and the group $X^2$ having the general formula (IV):

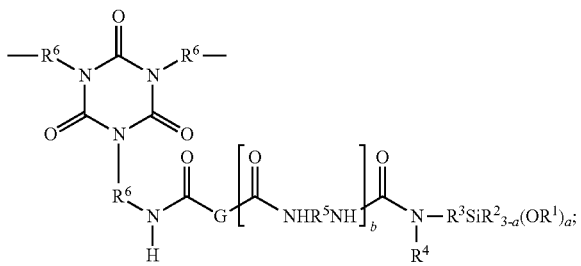

(IV)

and,
subscripts a, b, c, m and n are integers wherein a is 1 to 3; b is 0 or 1; c is 0 to 5; m is 1 to 100; and, n is 0 to 100, with the provisos that when b is 0, $R^4$ is hydrogen; when n is 0, $R^7$ is a branched alkylene group of from 3 to 12 carbon atoms; and, when n is 1 to 100, $R^7$ and $R^8$ are different alkylene groups.

The liquid moisture-curable resin herein imparts especially desirable properties to compositions such as coatings, sealants and adhesives formulated therewith. Due to their low crystallinity, these resins are liquids at ambient temperatures, i.e., at from 18° to 25° C., and therefore do not require heating prior to being formulated as coatings, sealants or adhesives. Other advantageous properties of the moisture-curable liquid silylated resins herein include their excellent flow and flattening characteristics, even in the absence of solvents, properties which are exploited to good effect in coatings, sealants and adhesives containing them.

In the case of moisture-curable coatings, particularly those intended for direct application to ceramic (inclusive of glass), polymeric or metallic surfaces in contrast to application to such surfaces that have first been coated with a primer, the moisture-cured resins herein exhibit markedly high levels of resistance to the effects of rapid deformation (impact) as well as exceptionally high degrees of adhesion that are very desirable in protective coatings. Coatings formulated with the resins of the present invention upon curing also exhibit excellent levels of flexibility and corrosion resistance and possess greater stability when exposed to ultraviolet (UV) radiation and greater resistance to air oxidation than coatings containing comparable amounts of moisture-cured silylated resins derived from polycarbonate diols prepared in whole or in large part from polyether diols.

Moisture-cured sealants formulated with the liquid silylated resins of the invention also exhibit high tensile strength, flexibility, adhesion and weatherability.

In the case of moisture-curable adhesives, particularly those intended for adhering flexible layers or lamina to each other, the excellent flow properties of the resins herein, even in the absence of viscosity-reducing agents such as solvents, make them especially desirable for incorporation in such products.

DETAILED DESCRIPTION OF THE INVENTION

Moisture-curable silylated resin of the present invention can be obtained by reacting at least one silylating agent with at least one of: polycarbonate diol (V); hydroxyl-terminated polyurethane (VI) derived from the reaction of organic polyisocyanate with an excess of polycarbonate diol (V); and, isocyanate-terminated polyurethane (VII) derived from the reaction of an excess of an organic polyisocyanate with polycarbonate diol (V).

Processes for the preparation of polycarbonate diol (V), hydroxyl-terminated polyurethane (VI) and isocyanate-terminated polyurethane (VII) and processes for the silylation of diol (V) and polyurethanes (VI) and (VII) are described herein below.

A. Polycarbonate Diol (V)

Polycarbonate diol (V) can be obtained by reacting at least one carbonylating agent with diol of which at least 80 mole percent, preferably at least 90 mole, and more preferably at least 95 mole percent and still more preferably 100 mole percent, is at least one of a mixture of at least two different acyclic straight chain aliphatic diols, each such diol possessing up to 12 carbon atoms, preferably 2 to 12 carbon atoms, and more preferably from 2 to 10 carbon atoms; at least one acyclic branched chain aliphatic diol possessing up to 12 carbon atoms, preferably 3 to 12 carbon atoms and more preferably from 3 to 10 carbon atoms; and, a mixture of at least one straight chain aliphatic diol possessing up to 12 carbon atoms, preferably 2 to 12 carbon atoms and more preferably from 2 to 10 carbon atoms, and at least one acyclic branched chain aliphatic diol possessing up to 12 carbon atoms, preferably 3 to 12 carbon atoms and more preferably from 3 to 10 carbon atoms.

Suitable carbonylating agents for reaction with the aforementioned polyol(s) to produce polycarbonate diol(s) (V) include, but are not limited to, phosgene, triphosgene, [1,3,5] trioxane-2,4,6-trione, aliphatic and aromatic carbonates (carbonate esters) such as dialkyl carbonates, diarylcarbonates, alkylene carbonates, alkylaryl carbonates, and mixtures thereof. For example, the carbonate compound can be dimethyl carbonate, diethyl carbonate, di-n-butyl carbonate, diisobutyl carbonate, diphenyl carbonate, methylphenyl carbonate, ethylene carbonate, propylene carbonate, and mixtures thereof. Of these carbonylating agents, phosgene, dialkyl carbonates such as dimethyl carbonate and diethyl carbonate, and alkylene carbonates such as ethylene carbonate and propylene carbonate are generally preferred with phosgene being more preferred.

In one embodiment of polycarbonate diol (V), at least two different acyclic straight chain aliphatic diols each possessing from 2 to 12 carbon atoms, and preferably from 2 to 10 carbon atoms, are reacted with the selected carbonylating agent(s) to provide a mixture of copolycarbonate diols (V). Among the suitable acyclic straight chain aliphatic diols that can be used for the preparation of a mixture of copolycarbonate diols (V) are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, and the like. The proportions of acyclic straight chain aliphatic diols to each other can vary widely, e.g., from 20 to 80 mole percent, and preferably from 40 to 60 mole percent, of a first acyclic straight chain aliphatic diol with the balance being made up of second, third, etc., acyclic straight chain aliphatic diol(s).

With further regard to this embodiment of polycarbonate diol (V), it is especially advantageous to employ a mixture of two or more different acyclic straight chain aliphatic diols in which at least one such diol possesses an even number of carbon atoms and at least one other such diol possess an odd number of carbon atoms. The diol(s) possessing an even number of carbon atoms can represent from 20 to 80 mole percent, and preferably, from 40 to 60 mole percent, of the diol mixture with the diol(s) possessing an odd number of carbon atoms making up the remainder of the diol mixture.

In accordance with this particular embodiment, some suitable diol mixtures include the following:

| Diol Mixture | Acyclic Straight Chain Aliphatic Diol(s) of Even Carbon Number, mole percent | Acyclic Straight Chain Aliphatic Diol(s) of Odd Carbon Number, mole percent |
| --- | --- | --- |
| A | ethylene glycol, 50 | 1,3-propanediol, 50 |
| B | ethylene glycol, 60 | 1,3-propanediol, 40 |
| C | ethylene glycol, 60 | 1,5-pentanediol, 40 |
| D | 1,4-butanediol, 40 | 1,3-propanediol, 60 |
| E | ethylene glycol, 30 1,4-butanediol, 20 | 1,5-pentanediol, 20 |
| F | 1,4-butanediol, 60 | 1,5-pentanediol, 40 |
| G | ethylene glycol, 50 | 1,7-heptanediol, 50 |
| H | 1,6-hexanediol, 50 | 1,5-pentanediol, 50 |
| I | 1,4-butanediol, 40 | 1,5-pentanediol, 30 1,7-heptanediol, 30 |
| J | 1,4-butanediol, 60 | 1,7-heptanediol, 40 |
| K | ethylene glycol, 35 1,4-butanediol, 40 | 1,5-pentanediol, 15 1,7-heptanediol, 15 |

In an embodiment, use of such mixtures of acyclic straight chain aliphatic diols in the preparation of polycarbonate diols (V) has been found to reduce the crystallinity of the product copolycarbonate diols even further compared with the use of mixtures of acyclic straight chain copolycarbonate diols in which all, or nearly all, of the constituent diols have chain lengths having an even number of carbon atoms or conversely, an odd number of carbon atoms.

In another embodiment of polycarbonate diol (V), at least one acyclic branched aliphatic diol possessing up to 12 carbon atoms, and preferably from 3 to 10 carbon atoms, is reacted with carbonylating agent(s) to provide the polycarbonate diol (V). Suitable acyclic branched diols include, but are not limited to, 2-methyl-1,3-propanediol, 2-methy-1,4-butanediol, 2,3-dimethyl-1,4-butanediol, 2-methyl-1,5-pentanediol,3-methyl-1,5-pentanediol, 2,2,4-trimethyl-1,6-hexanediol, 3,3,5-trimethyl-1,6-hexanediol, 2,3,5-trimethyl-1,6-pentanediol, 2-methyl-3-ethyl-1,5-pentanediol, 2-ethyl-3-propyl-1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl-3-ethyl-2-propyl-1,5-pentanediol, 2-butyl-2-ethyl-1,5-pentanediol, and 3-butyl-2-propyl-1,5-pentanediol and combinations thereof.

Of these acyclic branched aliphatic diols, 2-methyl-1,3-propanediol, 2-methyl-1,4-butanediol, 2,3-dimethyl-1,4-butanediol and 2-methyl-1,5-pentanediol and mixtures thereof are preferred for use in the preparation of polycarbonate diols (V). Where mixtures of acyclic branched chain aliphatic diols are used, it can be advantageous to employ at least one such diol possessing an even number of carbon atoms and at least one such diol possessing an odd number of carbon atoms.

In yet another embodiment, polycarbonate diol (V) and mixtures of such diols are obtained from the reaction of the selected carbonylating agent(s) with mixtures containing at least one acyclic straight chain diol and at least one acyclic branched chain aliphatic diol of the foregoing types. The proportions of acyclic straight chain aliphatic diol(s) and acyclic branched chain aliphatic diol(s) can vary widely in these diol mixtures, e.g., from 20 to 80 mole percent, and preferably from 40 to 60 weight percent, of the former with the latter making up the balance of the diol mixtures. Here also it can be advantageous to employ diol mixtures in the preparation of polycarbonate diols (V) in which at least one constituent diol, e.g., acyclic straight chain aliphatic diol, possesses an even number of carbon atoms and at least one other constituent diol, e.g., acyclic branched chain aliphatic diol, possesses an odd number of carbon atoms or vice versa. Some suitable mixtures of acyclic straight chain aliphatic diol(s) and acyclic branched chain aliphatic diol(s) for preparation of polycarbonate diols (V) include the following:

| Diol Mixture | Acyclic Straight Chain Aliphatic Diol(s), mole percent | Acyclic Branched Chain Aliphatic Diol(s), mole percent |
| --- | --- | --- |
| L | ethylene glycol, 50 | 2-methyl-1,4-butanediol, 50 |
| M | ethylene glycol, 50 | 2-methyl-1,4-butanediol, 50 |
| N | 1,3-propanediol, 50 | 2-methyl-1,3-propanediol, 50 |
| O | 1,4-butanediol, 65 | 2,3-dimethyl-1,4-butanediol, 35 |
| P | ethylene glycol, 30 1,3-propanediol 25 | 2-methyl-1,3-propanediol, 45 |
| Q | 1,4-butanediol, 60 | 2-methyl-1,5-pentanediol, 40 |
| R | 1,6-hexanediol, 60 | 3-methyl-1,5-pentanediol, 40 |
| S | ethylene glycol, 30 1,4-butanediol, 20 | 2-methyl-1,5-pentanediol, 30 2,4-dimethyl-3-ethyl-1,5-pentanediol, 20 |

| Diol Mixture | Acyclic Straight Chain Aliphatic Diol(s), mole percent | Acyclic Branched Chain Aliphatic Diol(s), mole percent |
|---|---|---|
| T | 1,4-butanediol, 50<br>1,6-hexanediol, 25 | 2-methyl-1,4-butanediol, 50 |

The reaction of diol(s) with carbonylating agent(s) can be carried out in accordance with known and conventional procedures to produce polycarbonate diol(s) (V). As the reaction proceeds, by-product(s) of the reaction, e.g., HCl in the case of phosgene as carbonylating agent and alkanol(s) in the case of dialkyl carbonates as carbonylating agents, are advantageously removed from the reaction zone on a continuous basis. The amounts of diol(s) and carbonylating agent(s) may vary provided copolycarbonate diol(s) (V) are obtained. Thus, for example, the mole ratio of total diol(s) to total carbonylating agent(s) can vary from 2.0:1.0 to 1.01:1.0 and preferably from 1.3:1.0 to 1.1:1.0. In an embodiment, it is generally preferred to employ a molar excess of diol(s) to carbonylating agent(s).

In some cases, it may be desirable to employ at least one catalyst for the reaction of carbonylating agent and diol to produce polycarbonate diol(s) (V), e.g., a transesterification catalyst. Suitable transesterification catalysts include, but are not limited to, titanium compounds such as titanium tetrachloride and tetraalkoxytitaniums such as tetra-n-butoxy-titanium and tetraisopropoxytitanium; metallic tin and tin compounds such as tin(II)hydroxide, tin(II)chloride, dibutyltin laurate, dibutyltin oxide, and butyltin tris(ethylhexanoate). Of the aforementioned transesterification catalysts, it is preferred to employ one or more of tetra-n-butoxytitanium, tetraisopropoxytitanium, dibutyltin laurate, dibutyltin oxide and butyltin tris(ethylhexanoate). The catalyst will be present is the transesterification reaction medium in at least a transesterification catalyzing-effective amount, for example, in an amount of from 1 to 5,000 ppm, and preferably from 10 to 1,000 ppm, based on the weight of the diol reactant(s).

The reaction conditions employed for producing polycarbonate diol (V) can vary widely, again, provided polycarbonate (V) is obtained. For example, specific reaction conditions include heating the reaction mixture at a temperature of from 110 to 200° C. under ambient atmospheric pressure for 1 to 24 hours, then at a temperature of from 110 to 260° C., preferably 140 to 240° C. under reduced pressure for from 1 to 20 hours, and then under reduced pressure gradually taken down to 20 mmHg or less at 140 to 240° C. for 0.1 to 20 hours. The reactor is preferably provided with a means, e.g., a distillation column, to remove by-product(s) of the reaction as it/they are produced.

Polycarbonate diol (V) can advantageously possess a number average molecular weight as measured in accordance with ASTM D5296-11, Standard Test method for Molecular Weight Averages and Molecular Weight Distribution of Polystyrene by High Performance Size-Exclusion Chromatography of from 400 to 5,000, preferably from 500 to 4,000 and more preferably from 1500 to 3000, and a hydroxyl value (KOH mg/g) as measured in accordance with ASTM E222-10, Standard Test method for Hydroxyl Groups Using acetic Anhydride Acetylation, of from 25 to 250 and preferably from 50 to 125.

B. Hydroxyl-Terminated Polyurethane (VI) and Isocyanate-Terminated Polyurethane (VII)

Hydroxyl-terminated polyurethane (VI) and isocyanate-terminated polyurethane (VII) can be obtained by reacting at least one polycarbonate diol (V) as described above with at least one organic polyisocyanate, in the absence or in the presence of a catalytically effective amount of catalyst for the urethane-forming reaction, under urethane-forming reaction conditions such as any of those well known in the art.

Suitable organic polyisocyanates may be represented by the formula (VIII):

$$Q(NCO)_z \qquad (VIII)$$

wherein z is 2 or 3, preferably 2, and more preferably a blend of polyisocyanates having at least one diisocyanate of structure (VIII) where z is 2 and at least one triisocyanate of structure (VIII) where z is 3, and Q is a z-valent organic group, preferably a divalent or trivalent hydrocarbon group such as an aliphatic or cycloaliphatic group containing from 1 to 30 carbon atoms, preferably from 6 to 24 carbon atoms, or a divalent or trivalent organic group derived from a hydrocarbon and containing at least one isocyanurate ring, at least one urethane group or at least one oxygen atom. The polyisocyanate containing a hydrocarbon and at least one urethane group can be prepared from the reaction of a diisocyanate or triisocyanate with a trihydroxyalkane of from 3 to 10 carbon atoms.

Suitable organic polyisocyanates for use in preparing hydroxyl-terminated polyurethane (VI) and isocyanate-terminated polyurethane (VII) include, but are not limited to, diisocyanates, triisocyanates, dimers, trimers and mixtures thereof. Specific examples of useful polyisocyanates include, but are not limited to, hydrogenated 4,4'-diphenylmethane diisocyanate, hexamethylene diisocyanate, isophorone diisocyanate, 4,4'-dicyclohexylmethane diisocyanate, 1,3,6-hexamethylene triisocyanate, 1,6,11-undecane triisocyanate, isophorone diisocyanate dimer, isophorone diisocyanate trimer, reaction product of isophorone diisocyanate with a triol, and the like, and mixtures thereof. Isophorone diisocyanate its dimers and trimers and mixtures thereof are preferred for use herein.

In one embodiment, the organic polyisocyanate (VIII) is a mixture comprising an organic polyisocyanate containing two isocyanate groups and an organic polyisocyanate containing three isocyanate groups. The molar ratio of the organic polyisocyanate containing two isocyanate groups and organic polyisocyanate containing three isocyanate groups is from 10:1 to 1:10, preferably from 2:1 to 1:2, and more preferable 1.5:1 to 1:1.5. Representative and non-limiting of the organic polyisocyanate containing two isocyanate groups The chain extension reaction can be carried out in various ways depending on the desired properties of the chain extended polycarbonate diol (V). For example, while various suitable chain extension agents are described herein, polyisocyanates (VIII) are well suited as chain extension agents. In one embodiment, where it is desired to have at least one chain extended polycarbonate diol (V), the at least one chain extended polycarbonate diol (V) can be produced by continuously mixing a molar excess of polycarbonate diol (V) with the polyisocyanate (VIII) to produce the hydroxyl-terminated polyurethane (VI). A molar excess of polycarbonate diol (V) in the chain extension reaction produces an OH:NCO molar ratio greater than 1:1. In more specific embodiments the OH:NCO molar ratio ranges from 1.1:1 to 10:1, even more specifically, from 1.5:1 to 3:1, and even more specifically from 1.8:1 to 2.2:1 to provide hydroxyl-terminated polyurethane (VI). In one embodiment, where it is desired to have a chain extended polycarbonate diol (V) where the reactive functional groups are terminal isocyanate groups, the chain extended polycarbonate diol (V) can be produced by continuously mixing a molar excess of polyisocyanate (VIII) with the polycarbonate diol (V) to provide isocyanate-terminated polyurethane (VII). A molar excess of polyisocyanate (VIII) in the chain extension reaction produces an OH:NCO molar ratio less than 1:1. In more specific embodiments the OH:NCO molar ratio ranges from 0.1:1 to 0.9:1, even more specifically, from 0.3:1 to 0.7:1, and even move specifically from 0.45:1 to 0.55:1 to provide isocyanate-terminated polyurethane (VII).

Conditions for the polyurethane-forming reaction can include reaction temperatures of from 20 to 180° C. and preferably from 60 to 130° C., pressures of from 10 to 300 kilopascal, preferably from 50 to 150 kilopascal and more preferably 100 kilopascal, and reactions times of from 0.50 to 24 hours and preferably from 2 to 8 hours. The chain extension reaction can be carried out in the absence or presence of catalysts used for the urethane-forming reaction. Known and conventional catalysts for the urethane-forming reaction are contemplated. Suitable catalysts include metal and non-metal catalysts. Examples of the metal portion of the metal condensation catalysts useful in the present invention include tin, titanium, zirconium, lead, iron cobalt, antimony, manganese, bismuth and zinc compounds. Other suitable non-limiting examples of catalysts used for making the first or second intermediate product are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2{++}$, $UO_2{++}$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to 18 carbon atoms, and reaction products of alcoholates of various metals with carboxylic acids, beta-diketones, and 2-(N,N-dialkylamino)alkanols, such as well-known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin dilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof. These catalysts are employed at from 0.001 to 5 weight percent, more specifically from 0.001 to 2 weight percent and even more specifically, from 0.005 to 1 weight percent, and even more preferably 0.005 to 0.1 weight percent, based on the weight of the polycarbonate diol (V). In one embodiment, the catalyst is 20 ppm Sn or 120 ppm of catalyst compound, e.g., dibutyltin dilaurate (DBTDL), relative to the polycarbonate diol (V).

C. Moisture-Curable Silyl Group-Containing Resin

Silylation of polycarbonate diol (V), hydroxyl-terminated polyurethane (VI) and isocyanate-terminated polyurethane (VII) described above can be carried out employing suitable silylating agent(s), preferably, at least 90 percent completion and more preferably to at leat 95 percent completion.

Silylation of polycarbonate diol (V), hydroxyl-terminated polyurethane (VI) and mixtures thereof can be accomplished by reaction with an isocyanatosilane. Suitable isocyanatosilanes are those of the general formula (IX):

(IX)

wherein each $R^1$ is independently an alkyl group of from 1 to 6 carbon atoms and preferably from 1 to 3 carbon atoms, each $R^2$ is independently an alkyl group of from 1 to 4 carbon atoms or phenyl group, preferably from 1 to 3 carbon atoms, $R^3$ is a divalent alkylene group of from 1 to 12 carbon atoms, preferably of from 1 to 3 carbon atoms, and more preferably 3 carbon atoms, and a is an integer of from 1 to 3.

Examples of such isocyanatosilanes include, but are not limited to, 1-isocyanatomethyltrimethoxysilane, 2-isocyanatoethyltrimethoxysilane, 3-isocyanatopropyltrimethoxysilane, 1-isocyanatomethyltriethoxysilane, 2-isocyanatoethyltriethoxysilane, 3-isocyanatopropyltriethoxysilane, 1-isocyanatomethylmethyldimethoxysilane, 3-isocyanatopropylmethyldimethoxysilane, 1-isocyantomethylmethyldiethoxysilane, 3-isocyanatopropylmethyldiethoxysilane and their mixtures.

Silylation of isocyanate-terminated polyurethane (VII) can be accomplished by reaction of isocyanate-terminated polyurethane (VII) with at least one silane possessing at least one functionality that is reactive for isocyanate, e.g., primary amino, secondary amino or mercapto (sufhydryl). Advantageously, the silane is a primary or secondary aminosilane of the general formula (X):

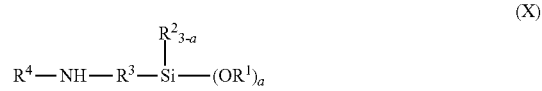

(X)

wherein each $R^1$ is independently an alkyl group of from 1 to 6 carbon atoms and preferably from 1 to 3 carbon atoms, each $R^2$ is independently an alkyl group of from 1 to 4 carbon atoms or phenyl group, preferably from 1 to 3 carbon atoms, $R^3$ is a divalent alkylene group of from 1 to 12 carbon atoms, preferably of from 1 to 3 carbon atoms, and more preferably 3 carbon atoms and $R^4$ is an alkyl group of from 1 to 12 carbon atoms, phenyl group, hydrogen or $-R^3SiR^2_{3-a}(OR^1)_a$ group and is preferably an alkyl of from 1 to 4 carbon atoms and a is an integer of from 1 to 3, preferably.

Examples of primary and secondary aminosilanes include, but are not limited to, 3-aminopropyltrimethoxysilane, 3-aminopropyltriethoxysilane, 4-amino-3,3-dimethylbutyltrimethoxysilane, 4-amino-3,3-dimethylbutyldimethoxymethylsilane, N-methylaminoisobutyltrimethoxysilane, N-ethylaminoisobutyltrimethoxysilane, N-ethyl-3-amino-2-methylpropyldiethoxymethylsilane, N-ethyl-3-amino-2-methylpropyltriethoxy silane, N-ethyl-3-amino-2-methylpropylmethyldimethoxysilane, N-butyl-3-aminopropyltrimethoxysilane, N-butyl-3-amino-2-methylpropyltrimethoxysilane, N-ethyl-4-amino-3,3-dimethylbutyldimethoxymethylsilane and N-ethyl-4-amino-3,3-dimethylbutyltrimethoxysilane, N,N-bis-(3-trimethoxysilylpropyl) amine and the like, with N-ethylaminoisobutyltrimethoxysilane, N-ethyl-4-amino-3,3-dimethylbutyltrimethoxysilane and N-butyl-3-aminopropyltrimethoxysilane being preferred.

The conditions for the silylation of the polycarbonate diol (V), the hydroxyl-terminated polyurethane (VI) and/or mixtures thereof with isocyanatosilane (IX) can include reaction temperatures of from 20 to 180° C. and preferably from 60 to 130° C., pressures of from 10 to 300 kilopascal, preferably from 50 to 150 kilopascal and more preferably 100 kilopascal, and reactions times of from 0.50 to 24 hours and preferably from 2 to 8 hours.

The reactions can be carried out in the absence or presence of catalysts used to catalyze the urethane-forming reaction. Known and conventional catalysts for the urethane-forming reaction are contemplated. Suitable catalysts include metal and non-metal catalysts, as discussed above for the reaction of polycarbonate diol (V), the hydroxyl-terminated polyurethane (VI) and/or mixtures thereof with polyisocyanates (VIII). These catalysts are employed at from 0.001 to 5 weight percent, more specifically from 0.001 to 2 weight percent and even more specifically, from 0.005 to 1 weight percent, and even more preferably 0.005 to 0.1 weight percent, based on the weight of the polycarbonate diol (V). In one embodiment, the catalyst is 20 ppm Sn or 120 ppm of catalyst compound, such as dibutyltin dilaurate, dibutyltin diacetate, or dioctyltin diacetate, relative to the polycarbonate diol (V); a weight percent of 0.012%. It is contemplated that the catalysts used in the formation of the hydroxyl-terminated polyurethane (VI) can also be used in the reaction of the hydroxyl-terminated polyurethane (VI) with the isocyanatosilane (IX).

The molar ratio of the hydroxyl groups of the polycarbonate diol (V), the hydroxyl-terminated polyurethane (VI) and/or mixtures thereof to the isocyanatosilane (IX) is from 0.75:1.0 to 1.5:1, and preferably from 0.95:1 to 1.1. In one embodiment, a molar excess of the isocyanatosilane (IX) is used.

In one embodiment, the excess of isocyanatosilane (IX) that is present at or near the completion of the silylation reaction is reacted with an active hydrogen-containing compound to eliminate the presence of isocyanate groups from the reaction mixture. Active hydrogen-containing compounds include alcohols, diols, amines, mercaptans, lactams and mixtures thereof. Representative and non-limiting examples of active hydrogen-containing compounds include methanol, ethanol, isopropyl alcohol, diethylamine, dipropylamine, pyrrolidone, caprolactam, and mixtures therefore. The active hydrogen containing compound is used in molar excess to the remaining isocyanate group of the isocyanatosilane (IX) present at or near the end of the silylation reaction. In one embodiment, the amount of isocyanate present in the reaction mixture is determined in accordance with ASTM D2572-97(2010), Standard Test Method for Isocyanate Groups in Urethane Materials or Prepolymers.

The conditions for the silylation of the isocyanate-terminated polyurethane (VII) with an aminosilane (X) can include reaction temperatures of from 0 to 180° C. and preferably from 60 to 130° C., pressures of from 10 to 300 kilopascal, preferably from 50 to 150 kilopascal and more preferably 100 kilopascal, and reactions times of from 0.50 to 24 hours and preferably from 2 to 8 hours.

The reactions can be carried out in the absence or presence of at least one catalyst used to catalyze the urethane-forming reaction. Known and conventional catalysts for the urethane-forming reaction are contemplated. Suitable catalysts include metal and non-metal catalysts, as discussed above for the reaction of polycarbonate diol (V), the hydroxyl-terminated polyurethane (VI) and/or mixtures thereof with polyisocyanates (VIII). These catalysts are employed at from 0.001 to 5 weight percent, more specifically from 0.001 to 2 weight percent, and even more specifically, from 0.005 to 1 weight percent, and even more preferably 0.005 to 0.1 weight percent, based on the weight of the polycarbonate diol (V) used in the preparation of the isocyanato-terminated polyurethane (VII). In one embodiment, the catalyst is 20 ppm Sn or 120 ppm of catalyst compound, such as dibutyltin dilaurate, dibutyltin diacetate or dioctyltin diacetate, relative to the polycarbonate diol (V). It is contemplated that the catalysts used in the formation of the isocyanato-terminated polyurethane (VII) can also be used in the reaction of the isocyanato-terminated polyurethane (VII) with the aminosilane (X).

The molar ratio of the isocyanate groups of the isocyanato-terminated polyurethane (VII) to the aminosilane is from 0.75:1.0 to 1.5:1, and preferably from 0.95:1 to 1.1. In one embodiment, a molar excess of the aminosilane is used. In one embodiment, the amount of isocyanate present in the isocyanate-terminated polyurethane (VII) is determined in accordance with ASTM D2572-97(2010), Standard Test Method for Isocyanate Groups in Urethane Materials or Prepolymers.

In one embodiment, moisture-curable silylated resin (I) has a number average molecular weight as measured in accordance with ASTM D5296-11, Standard Test Method for Molecular Weight Averages and Molecular Weight Distribution of Polystyrene by High Performance Size-Exclusion Chromatography of from 800 to 20,000, preferably from 1500 to 10,000, and more preferably from 2,000 to 8,000.

In another embodiment, moisture-curable silylated resin (I) has a crystalline content as measured by differential scanning calorimetry (DSC), as described in ASTM F2625-0, Standard Test Method for Measurement of Enthalpy of Fusion, Percent Crystallinity, and Melting Point of Ultra-High-Molecular Weight Polyethylene by Means of Differential Scanning calorimetry of not greater than 10 weight percent crystallinity, and preferably not greater than 1 weight percent crystallinity, based on the total weight of the moisture-curable silylated resin (I).

In yet another embodiment, moisture-curable silylated resin (I) has a viscosity as measured in accordance with ASTM D1084-08, Standard Test Method for Viscosity of Adhesives of not greater than 100 Pascal second, and preferably from 0.05 to 50 Pascal·second.

In one embodiment, the moisture-curable silylated resin has the structure of formula (I), wherein $R^1$ is methyl or ethyl; $R^2$ is methylene, ethylene, propylene, 2-methylethylene or 2-methylpropylene; $R^4$ is methyl, ethyl or butyl; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is a divalent alkylene group of from 1 to 6 carbon atoms or a cycloalkylene group of from 6 to 10 carbon atoms; a is 2 or 3, preferably 3, b is 1, c is 0, 1 or 2; m is 5 to 15; n is 5 to 15.

In another embodiment, the moisture-curable silylated resin has the structure of formula (I), wherein $R^1$ is methyl or ethyl; $R^2$ is methylene, ethylene, propylene, 2-methylethylene or 2-methylpropylene; $R^4$ is methyl, ethyl or butyl; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is

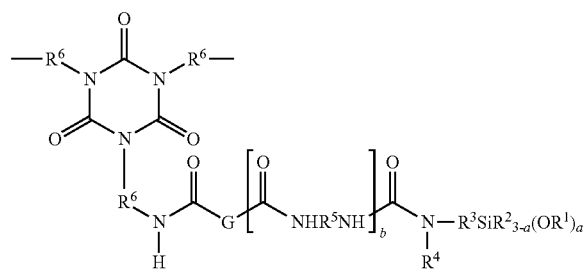

where G is previously defined; a is 2 or 3, preferably 3, b is 1, c is 0, 1 or 2; m is 5 to 15; n is 5 to 15.

In yet another embodiment, a composition comprises (i) at least one moisture-curable silylated resin of formula (I), wherein $R^{10}$ is a

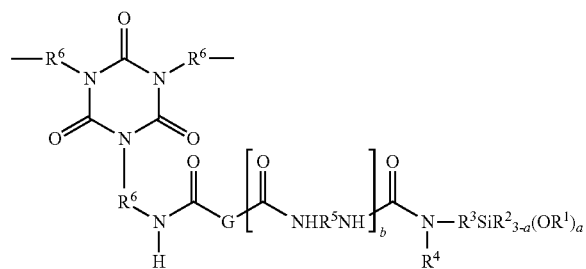

and (ii) at least one moisture-curable silylated resin of formula (I), wherein $R^{10}$ is divalent alkylene group of from 1 to 6 carbon atoms or a cycloalkylene group of from 6 to 10 carbon atoms. The composition comprising at least one (i) and at least one (ii) has a molar ratio of (i) to (ii) in one embodiment of from 0.3:1.5 to 1.5:0.3 and in another embodiment of from 0.7:1.0 to 1.0:0.7.

In one embodiment, the moisture-curable silylated resin has the structure of formula (I), wherein $R^1$ is methyl or ethyl; $R^2$ is methylene, ethylene, propylene, 2-methylethylene or 2-methylpropylene; $R^4$ is hydrogen; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is a divalent alkylene group of from 1 to 6 carbon atoms or a cycloalkylene group of from 6 to 10 carbon atoms; a is 2 or 3, preferably 3, b is 0, c is 0, 1 or 2; m is 5 to 15; n is 5 to 15.

In one more embodiment, the moisture-curable silylated resin has the structure of formula (I), wherein $R^1$ is methyl or ethyl; $R^2$ is methylene, ethylene, propylene, 2-methylethylene or 2-methylpropylene; $R^4$ is hydrogen; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is

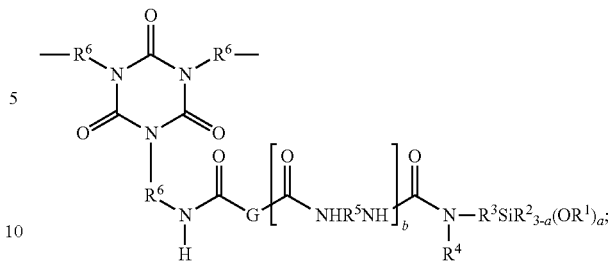

a is 2 or 3, preferably 3, b is 0, c is 0, 1 or 2; m is 5 to 15; n is 5 to 15.

In a further embodiment, a composition comprises (iii) at least one moisture-curable silylated resin of formula (I), wherein $R^{10}$ is a

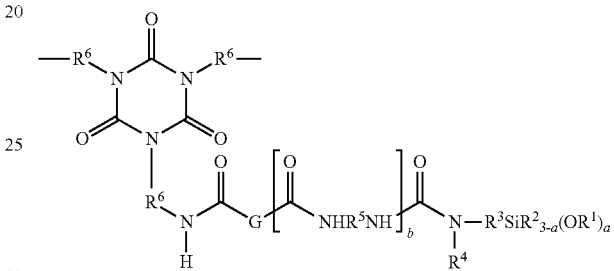

and (iv) at least one moisture-curable silylated resin of formula (I), wherein $R^{10}$ is divalent alkylene group of from 1 to 6 carbon atoms or a cycloalkylene group of from 6 to 10 carbon atoms. The composition comprising at least one (iii) and at least one (iv) has a molar ratio of (iii) to (iv) 0.3:1.5 to 1.5:0.3.

D. Coating Composition

According to another aspect of the invention, there is provided a moisture-curable coating composition comprising moisture-curable silylated resin (I) and in addition thereto, one or more other ingredients that are commonly included in known and conventional coating compositions. The coating composition can generally contain from 1 to 100 weight percent, and preferably from 5 to 50, weight percent of moisture-curable silylated resin(s) (I), based on the total weight of the coating composition.

Among the additional ingredients that can be used in the formulation of the moisture-curable coating composition are organoalkoxysilanes and silicone hardcoats to improve hardness, scratch resistance and weathering, metal particulates and metal oxide particulates to improve thermal properties and to pigment the coating, curing catalysts, leveling agents, antioxidants, UV stabilizers, dyes, fillers, adhesion promoters such as silanes containing reactive functional groups, and solvents. Combinations of these additional ingredients may also be used.

Suitable organoalkoxysilanes include methyltrimethoxysilane, methyltriethoxysilane, tetraethoxysilane, ethyltriethoxysilane, diethyldiethoxysilane, tetramethoxysilane, dimethyldimethoxysilane or mixture thereof which can form a partial condensate. Where used, organoalkoxysilanes and/or their partial condensates can be present at a level of from 0.5 to 50 weight percent, and preferably from 3 to 20 weight percent based on the weight percent of the total moisture-curable coating composition.

Metal particulates and metal oxide particulates that may be included in the moisture-curable coating composition include the metal and metal oxides of zinc, titanium, iron, aluminum, cobalt, iron, cupper, magnesium, manganese, antimony, lead, calcium, and mixtures thereof. The metal particulates and metal oxide particulates may be used to improve the heat conductivity and/or electrical conductivity of the compositions containing the moisture-curable silylated resin (I), to improve the corrosion resistance of metallic substrates in contact with compositions containing the moisture-curable silylated resin (I), or to add pigmentation to said compositions. For example, particulate iron and iron oxides improve the transport of heat through compositions containing the moisture-curable silylated resin (I). Compositions containing the moisture-curable silylated resin (I) and particulate zinc (powder) protects metallic surfaces, such as iron or steel, from corrosion. Various metallic oxides can be used to pigment the compositions containing the moisture-curable silylated resin (I). Representative and non-limiting pigments include red ochre, yellow ochre, white lead, azurite, smalt, ultramarine can be used for this purpose. Where utilized, particulate metal and/or metal oxide can be incorporate in the moisture-curable coating composition at a level of from 0.1 to 80 weight percent, and preferably from 5 to 40 weight percent, where the weight percent is based on the total weight of the moisture-curable composition.

Optionally, the moisture-curable coating composition of this invention can include a condensation catalyst in a known or conventional amount in order to reduce cure time. Suitable cure catalysts include metal and non-metal catalysts. The cure catalysts include those catalysts that have been used to prepare the moisture-curable silylated resin. Examples of the metal portion of the metal cure catalysts useful in the present invention include, but are not limited to, tin, titanium, zirconium, lead, iron cobalt, antimony, manganese, bismuth and zinc compounds. Other suitable non-limiting examples of cure catalysts include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2++$, $UO_2++$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to 18 carbon atoms, and reaction products of alcoholates of various metals with carboxylic acids, beta-diketones, and 2-(N,N-dialkylamino)alkanols, such as well-known chelates of titanium obtained by this or equivalent procedures. Further cure catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin dilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

These catalysts are employed at from 0.001 to 5 weight percent, more specifically from 0.001 to 2 weight percent and even more specifically, from 0.005 to 1 weight percent, and even more preferably 0.005 to 0.1 weight percent, based on the weight of the polycarbonate diol (V). In one embodiment, the catalyst is 20 ppm Sn or 120 ppm of catalyst compound, such as dibutyltin dilaurate, dibutyltin diacetate or dioctyltin diacetate, relative to the moisture curable silylated resin (I).

The moisture-curable coating composition herein can also include one or more surfactants as leveling agents. Examples of suitable leveling agents include fluorinated surfactants such as FLUORAD™ (3M Company), silicone polyethers such as Silwet® and CoatOSi® (Momentive Performance Materials, Inc.) and BYK (BYK Chemie).

The moisture-curable coating composition can also include one or more UV absorbers employed in a known or conventional amount such as the benzotriazoles. Preferred UV absorbers are those capable of co-condensing with silanes. Specific examples of UV absorbers include 4-[gamma-(trimethoxysilyl) propoxyl]-2-hydroxy benzophenone and 4-[gamma-(triethoxysilyl) propoxyl]-2-hydroxy benzophenone and 4,6-dibenzoyl-2-(3-triethoxysilylpropyl) resorcinol. When the preferred UV absorbers that are capable of co-condensing with silanes are used, it is important that the UV absorber co-condenses with other reacting species by thoroughly mixing the coating composition before applying it to a substrate. Co-condensing the UV absorber prevents coating performance loss caused by the leaching of free UV absorbers to the environment during weathering.

The moisture-curable coating composition herein can also include one or more antioxidants in a known or conventional amount such as the hindered phenols (e.g. IRGANOX® 1010 from Ciba Specialty Chemicals), dyes (e.g. methylene green, methylene blue, and the like), fillers and other known and conventional additives in the customary amounts.

In an embodiment, the moisture-curable coating composition herein can be prepared by mixing its components in any order.

The coating composition can be prepared by post-addition of a silicone thermal hardcoat composition such as PHC 587 (Momentive Performance Materials, Inc.). When this preparative method is used, it is important to allow time for the silane moieties of moisture-curable silylated resins (I) herein to co-condense with the partially condensed mixture of the silicone hardcoat composition. The pH of the resulting mixture may be further adjusted.

The moisture-curable coating composition may contain one or more organic solvents to adjust its solid content to a predetermined level. Suitable such solvents include C1-C4 alkanols such as methanol, ethanol, propanol, isopropanol, and butanol, glycols such as ethylene glycol, 1,3-propanediol, 1,4-butanediol, diethylene glycol and dipropylene glycol, glycol ethers such as propylene glycol monomethylether and propylene glycol dimethyl ether, aromatic solvents, such as xylenes, alkanes and cycloalkane, such as hexane, heptane and cyclohexane, and esters such as methyl acetate, ethyl acetate, n-butyl acetate, 2-acetyloxyethanol, 2-acetyloxy-2-methylethanol, and mixtures thereof. Optionally, water-miscible polar solvents such as dimethyl ketone, methyl ethyl ketone, diacetone alcohol, butyl cello solve, and the like, can be included as, or in, the solvent system. After any adjustment with optional solvent(s), the moisture-curable coating composition herein will advantageously contain from 1 to 99 weight percent solvent, preferably from 10 to 70 weight percent solvent, and preferably from 20 to 40, where the weight percent of the solvents is based on the total weight of the composition.

It is generally preferred that the moisture-curable coating composition herein be substantially free of water, e.g., in one embodiment that it contain from 0 to not more than 200 ppm water and in another embodiment that it contain 0 to not more than 50 ppm water. If desired, a water scavenger, e.g., a vinyltrimethoxysilane, can be added to the moisture-curable composition in known and conventional amounts to prevent or inhibit undesirable hydrolysis/condensation of its moisture-curable resin component(s) during storage.

Although a primer can be used if desired, advantageously, the moisture-curable coating composition of the invention is applied directly to the surface of the selected substrate, e.g., a ceramic, polymeric or metallic surface, without prior application of a primer.

Examples of ceramic substrates include architectural stone, e.g., granite and marble, ceramic tile, glass and vitreous materials of all kinds, and the like. Examples of polymeric substrates include polycarbonates, acrylic polymers, for example, poly(methylmethacrylate), and the like, polyesters, for example, poly(ethylene terephthalate), poly(butylene terephthalate), and the like, polyamides, polyimides, acrylonitrile-styrene copolymer, styrene-acrylonitrile-butadiene terpolymers, polyvinyl chloride, polyethylene, and the like. Examples of metal substrates include aluminum, copper, zinc, iron, tin and alloys containing these metals such as brass, steels of all types, e.g., cold rolled steel, stainless steel, galvanized steel, etc., and the like.

The moisture-curable coating composition can be applied to the surface of the selected substrate employing any of several known or conventional coating methods such as spraying, dipping, roll coating, and the like, followed by moisture-curing of the coating layer.

EXAMPLES

The following examples are intended to illustrate but in no way limit the scope of the present invention. All percentages are by weight based on the total weight of the indicated compositions and all temperatures are in degrees Celsius unless explicitly stated otherwise.

Example 1

Preparation of Moisture-Curable Silylated Resin Derived from the Reaction of Polycarbonate Diol Containing 1,6 Hexyl and 1,5 Pentyl Groups, Isophorone Diisocyanate, Isophorone Diisocyanate Trimer and N-ethyl-3-amino-2-methylpropyltrimethoxysilane Into a 500 mL round bottom flask equipped with a mechanical stirrer, dropping funnel, reflux condenser and nitrogen line, were charge polycarbonate diol A (a hydroxyl-terminated polycarbonate containing 45 mole percent 1,6-hexyl groups and 55 mole percent 1,5-pentyl groups, hydroxyl number of 56, equivalent weight of 1001.5 grams/mole, 124.31 grams, 0.0621 mol) and Solvesso 100 aromatic solvent (52 grams, obtained from ExxonMobil). The mixture was stirred under nitrogen and heated to 90° C. A mixture of isophorone diisocyanate (31.17 grams, 0.1402 mole) and isophorone diisocyanate trimer in butyl acetate (80.29 grams, 0.084 mol, obtained from Vencore X Chemical under the tradename Tolonate™ IDT 70B) were added and reacted at 90° C. for 2.5 hours. An FTIR spectrum of the reaction mixture did not detect any residual hydroxyl groups. The viscosity of the intermediate was 10.2 Pascal second. N-ethyl-3-amino-2-methylpropyltrimethoxysilane (89.31 grams, 0.4 mol, obtained from Momentive Performance Materials under the tradename A-Link* 15 silane) was added at 90° C. The reaction mixture underwent an exothermic reaction, heating the mixture to 118° C. The mixture was stirred 1.15 hours at 90° C. and then cooled to 46.5° C. FTIR analysis indicated that the isocyanate content was not detectable. The viscosity of the reaction product was 27.78 Pascal second. Vinyltrimethoxysilane (3.0 grams) was added as a desiccant. The final viscosity was 23.65 Pascal second.

Examples 2-5

Coating Compositions Containing Moisture-Curable Silylated Resin of Example 1, and Comparative Example A, Commercial Coating PSX-1001, Application to Cold Roll Steel Panels and Testing of the Cured Coating Coating compositions were prepared using the components listed in Table 1.

TABLE 1

Composition of coatings containing moisture-curable silylated resin from Example 1.

| | Amount, grams | | | | |
|---|---|---|---|---|---|
| Component | Example 1 | Example 2 | Example 3 | Example 4 | Example 5 |
| Resin of Example 1 | 125 | 125 | 125 | 125 | 125 |
| Solvesso 100 | 42 | | | 175 | |
| n-butyl acetate | | 42 | | | |
| Ti-Pure ® R-103 TiO$_2$ | | | | 100 | 100 |

A concentrate in the form of a grind paste containing the moisture-curable silylated resin from Example 1 was prepared. Into a 1-liter plastic beaker fastened securely to a mixer provided with a Cowles grinding blade were added approximately 300 grams of ZrO beads for grinding. The moisture-curable silylated resin from Example 1 (125 grams) was then added to the beaker followed by the R103 TiO$_2$ pigment (100 grams, obtained from DuPont). The mixer was set to a medium-high speed for Cowles Mill grinding until the resin and pigment were homogenously mixed together. Once the mixture appeared homogeneous, the Solvesso 100 aromatic solvent (100 grams) was added to the mixture and the mixer set to high speed for approximately 35 minutes. A Hegman grind was checked after 35 minutes to determine the quality of the grind. A Hegman grind rating of approximately 5 was achieved. At this point, the grind paste was filtered and collected. A similar procedure was used to prepare a grind using n-butyl acetate, instead of Solvesso aromatic solvent.

The coating compositions described in Table 1 were evaluated for Konig hardness, QUV stability, corrosion resistance and solvent resistance. The comparative Example A was a commercial coating form PPG obtained under the tradename PSX 1001.

A. Preparation and Cleaning of Cold Roll Steel Panels

The metal substrate used for testing of the moisture-curable coating compositions of Example 2-5 and comparative Example A was Cold Roll Steel APR10184 available from ACT Test Panels.

The cleaning solution for the cold roll steel test panels contained 0.06% wt Triton X-100, 0.52 weight percent sodium metasilicate (anhydrous), 0.49 weight percent sodium carbonate (anhydrous), 0.35 weight percent dibasic sodium phosphate (anhydrous), each available from Aldrich, and 98.57 weight percent deionized water. The cleaning solution was heated to between 65° C. to 70° C. The cold roll steel test panels were immersed in the heated cleaning solution under stirring for 2 to 3 minutes to remove any oil contaminants. The panels were then removed from the cleaning solution and immediately rinsed with deionized water. Kimwipe Kimtech Delicate Task Wipers (Kimberly Clark), were used to wipe the cleaned panels dry. The panels were then lightly sprayed with water to determine the water break of the cleaned panels. If the panels showed water beading, the aforedescribed cleaning procedure was repeated. Once the rinse water formed a continuous sheen, the cleaned panels were dried with a Kimwipe wiper.

The cleaned, dry panels were then subjected to sandblasting using a Speed Blaster (Zendex Tool Corporation). Once the panels were roughened by sandblasting, the panels were then re-cleaned employing the procedure described above.

B. Spray Application of Moisture-Curable Coating Compositions

PSX1001 (acrylic polysiloxane, PPG Industries) was formulated into a one-component moisture-curable coating composition for comparison purposes (control coating composition, designated Comparative Example A).

The coating compositions of Examples 2 and 3 and the aforedescribed control coating composition, comparative Example A, were separately applied by spraying to the bare, sandblasted, and cleaned cold roll steel test panels with dimensions 4 inches×6 inches. Spraying was carried out with a StartingLine HVLP gravity fed siphon spray hand spraygun (DeVilbiss). Each of the two moisture-curable coating compositions was sprayed at a wall pressure of 15 lb/in$^2$. The spraying technique was a side-to-side sweep of a spray onto a panel at a rate of approximately 1,000 inch per minute, indexing up and down the panel approximately 2 inches per sweep until approximately 5.0 to 7.0 mils of dry coating thickness were applied to the test panels.

C. Cure Time and Conditioning

Once the test panels were coated with the moisture-curable coating compositions, the coatings were then moisture-cured under ambient conditions for at least 7 days.

After one week of ambient moisture curing, two panels coated with each of the cured coating compositions of Examples 2 and 3 and two panels coated with the cured control coating composition, comparative Example A, were covered on the reverse (uncoated) side and edges with a water resistant tape (available from 3M). The coated sides were scribed with a 4 inches long line along the mid-section of the panel using a sharp stainless steel cutting tool. The test panels were then placed into a Neutral Salt Spray Testing booth. The test panels were then tested for three weeks under Neutral Salt Spray Testing conditions as described below.

D. Neutral Salt Spray Testing

Salt spray testing was performed according to ASTM B117-90 "Standard Test Method of Salt Spray (FOG) Testing".

After three weeks in the testing booth, the panels coated with the coating composition of Examples 2 and 3 and those coated with the control coating composition, comparative Example A, were removed and allowed to dry.

Upon becoming fully dry, the test panels were subjected to high pressure air blasting to loosen any coating which may have delaminated from the scribed area. The high pressure air blasting was also used to determine the amount of delamination which may have occurred underneath the coating surface due to undercutting of the salt solution between the coating and the sand blasted substrate.

The amount of corrosion that occurred near the scribe line was determined by measuring the length of the corrosion perpendicular to the scribe line in millimeters for the minimum length, the maximum length and the average length. The average length was determined by measuring the corrosion at five points ½ inch apart, summing the 5 data points and then dividing by five. The results of the corrosion test are given in Table 2.

TABLE 2

Corrosion of coated panels along a scribe line after exposure to salt spray for 3 weeks at room temperature.

| Sample | Minimum corrosion, mm | Maximum corrosion, mm | Average corrosion, mm |
|---|---|---|---|
| Comp. Ex. A | 1.0 | 5.0 | 3.0 |
| Example 2 | 1.5 | 4.0 | 2.5 |
| Example 3 | 1.0 | 5.0 | 2.4 |

E. Konig Pendulum Hardness Test

ASTM D-4366-95, Standard Test method for hardness of Organic Coatings by Pendulum Damping Test, Test Method A—Konig Pendulum Harness Test. The Konig hardness was determined at different times from the original application of the coating. The results are presented in Table 3.

TABLE 3

Konig hardness data at different times.

| | Time, days | | | | | |
|---|---|---|---|---|---|---|
| Sample | 1 | 4 | 11 | 29 | 60 | 81 |
| Comp. Ex. A | 2.0 | 7.0 | 19.5 | 47.0 | 51.0 | 60.5 |
| Example 2 | 0.0 | 5.5 | 13.0 | 27.0 | 31.5 | 39.0 |
| Example 3 | 9.0 | 3.5 | 10.5 | 23.5 | 25.5 | 31.5 |

F. Chemical Resistance Testing

Coated test panels were also tested for chemical resistance by placing a solvent in a small vial, packing a piece of cotton in the top portion of the vial and quickly inverting the vial onto the coating test surface thereby allowing contact of the solvent saturated cotton swab with the coated surface of a panel. The vials were then secured to the coating surface for 24 hours. A visual inspection was carried out after 24 hours to evaluate the chemical and/or solvent resistance of the coatings. Five solvents were tested: acetone, ethanol, MEK, toluene and xylene, an acidic solution and an alkaline solution.

The results are presented in Table 4. The numerical values represent a continuum in which 1 represents a coating that is very badly and delaminated from the panel, 2 represents a coating that is very damaged, but remains bonded to the panel, 3 represents a coating that is damaged, hazy and etched, but remains bonded to the panel, 4 represents a coating that has formed a faint ring line between the chemically exposed surface and the surface that was not chemically exposed, and 5 represents no change in the coating appearance.

TABLE 4

Data on the solvent and chemical resistance of coating of the present invention and a control coating.

| Sample | Acetone | Ethanol | MEK | Toluene | Xylene | 10% HCl | 10% NaOH |
|---|---|---|---|---|---|---|---|
| comp. Ex. A | 1 | 2.7 | 1 | 1 | 1 | 3.5 | 2.9 |
| Example 2 | 4.3 | 4.8 | 4.2 | 4 | 4.3 | 5 | 5 |
| Example 3 | 4.3 | 4.5 | 4.5 | 4.2 | 4.5 | 5 | 5 |

After 24 hours, the control coating, comparative Example A, had exhibited a badly damaged and assigned a value of 1 for exposure to acetone, MEK, toluene and xylene and damaged and etched and assigned a value between 2.7 and 3.5 for ethanol and 10% HCl and 10% NaOH aqueous solutions. In contrast, the coating composition of Examples 2 and 3 showed only a very faint circle from a solvent and assigned a value between 4 and 4.8, and no damage for the acidic or alkaline solutions and assigned a value between 5, being in contact with the coating for 24 hours.

G. Environmental Resistance to UV Radiation.

The color of test specimens before and after exposure to ultraviolent radiation was determined. The exposure to ultraviolet radiation was carried out in accordance with ASTM D-4587-05, Standard Practice for Fluorescent UV-Condensation Exposure of Paint and Related Coatings. The color was determined using a Konica Minolta CR-400 instrument, which provided L*, a* and b* color. The results are presented in Table 5.

TABLE 5

Color of test specimens before and after exposure to ultraviolet radiation.

| Sample | L* | a* | b* | ΔE |
|---|---|---|---|---|
| comp. Ex. A | 95.61 | −0.45 | 6.02 | |
| comp. Ex. A, 58 days QUV-A | 96.72 | −0.56 | 2.36 | 3.82 |
| comp. Ex. A | 95.60 | −0.45 | 6.02 | |
| comp. Ex. A, 58 days QUV-B | 97.30 | −0.94 | 3.00 | 3.50 |
| Example 2 | 63.56 | 0.50 | 1.81 | |
| Example 2, 58 days QUV-A | 64.66 | 0.51 | 2.02 | 1.12 |
| Example 2 | 62.59 | 0.48 | 1.87 | |
| Example 2, 58 days QUV-B | 63.43 | 0.21 | 2.16 | 0.93 |
| Example 3 | 62.96 | 0.50 | 1.66 | |
| Example 3, 58 days QUV-A | 63.43 | 0.45 | 1.97 | 0.57 |
| Example 3 | 63.30 | 0.46 | 1.71 | |
| Example 3, 58 days QUV-B | 63.80 | 0.11 | 2.20 | 0.78 |

The coating compositions of the present invention, Examples 2 and 3 had less change in the b* coordinate after exposure to 58 days of ultraviolet radiation, A and B.

The gloss of the coating specimens was determined in accordance with ASTM D323-89, Standard Test Method for Specular Gloss, before and after 58 days exposure to ultraviolet radiation. The gloss data are presented in Table 6.

TABLE 6

Gloss of coating before and after exposure to ultraviolet radiation.

| Sample | 20° | 60° | 80° |
|---|---|---|---|
| comp. Ex. A | 85.4 | 94.5 | 98.2 |
| comp. Ex. A, 58 days QUV-A | 65.50 | 86.20 | 87.20 |
| comp. Ex. A | 86.6 | 95.3 | 97.4 |
| comp. Ex. A, 58 days QUV-B | 34.10 | 66.1 | 94.8 |
| Example 2 | 81.5 | 108 | 94.4 |
| Example 2, 58 days QUV-A | 73.10 | 102 | 84.6 |
| Example 2 | 85.4 | 104 | 93.8 |
| Example 2, 58 days QUV-B | 72.80 | 99.9 | 89.7 |
| Example 3 | 76.4 | 98.7 | 95.2 |
| Example 3, 58 days QUV-A | 66.00 | 88.8 | 74.5 |
| Example 3 | 83.9 | 97.7 | 96.8 |
| Example 3, 58 days QUV-B | 67.20 | 89.7 | 88.4 |

Example 6

Preparation of Moisture-Curable Silylated Resin Derived from the Reaction of Polycarbonate Diol Containing 1,6 Hexyl and 1,5 Pentyl Groups, Isophorone Diisocyanate, and N-ethyl-3-amino-2-methylpropyltrimethoxysilane Into a 500 mL round bottom flask equipped with a mechanical stirrer, dropping funnel, reflux condenser and nitrogen line, were charge polycarbonate diol A (a hydroxyl-terminated polycarbonate containing 45 mole percent 1,6-hexyl groups and 55 mole percent 1,5-pentyl groups, hydroxyl number of 56, equivalent weight of 1001.5 grams/mole, 200 grams, 0.1 mol) and Solvesso 100 aromatic solvent (113 grams, obtained from ExxonMobil). The mixture was stirred under nitrogen and heated. Isophorone diisocyanate (36.2 grams, 0.163 mole) was added and reacted hours until the reaction mixture did not have any detect any residual hydroxyl groups. N-Ethyl-3-amino-2-methylpropyltrimethoxysilane (28.88 grams, 0.13mol, obtained from Momentive Performance Materials under the tradename A-Link* 15 silane) was added. The mixture was stirred until the isocyanate content was not detectable.

A coating composition having the components of Table 7 was prepared using the procedure of Example 4.

TABLE 7

The formulation of coating composition using resin prepared in Example 6.

| Component | Amounts, grams |
|---|---|
| Resin of Ex. 6 | 241 |
| Solvesso ™ 100 aromatic fluid (ExxonMobile) | 155.4 |
| Ti-Pure ® R-103TiO$_2$ (DuPont) | 59 |

The properties of the coating are:
Konig hardness: 5 after 56 days
Initial color: L*=96.23; a*=−1.41; b*=0.12
Initial gloss: 20°=66.8; 60°=80.6; 80°=93.3
Viscosity after aging 50° C.: 21 days: 1.59 Pascal second
The coating composition had low viscosity of 1.59 Pascal second after aging for 21 days and high initial gloss of 93.3 at an angle of 80°.

Comparative Example B

Preparation of Moisture-Curable Silylated Resin Derived from the Reaction of Polycarbonate Diol Containing 1,6 Hexyl Group, Isophorone Diisocyanate, and N-ethyl-3-amino-2-methylpropyltrimethoxysilane Into a 500 mL round bottom flask equipped with a mechanical stirrer, dropping funnel, reflux condenser and nitrogen line, were charge polycarbonate diol B (a hydroxyl-terminated polycarbonate containing 1,6-hexyl groups, hydroxyl number of 56, equivalent weight of 1001.5 grams/mole, melting point 50° C., 200 grams, 0.1 mol) and xylene aromatic solvent (114 grams). The mixture was stirred under nitrogen and heated. Isophorone diisocyanate (36.8 grams, 0.166 mole) was added and reacted hours until the reaction mixture did not have any detect any residual hydroxyl groups. N-Ethyl-3-amino-2-methylpropyltrimethoxysilane (28.79 grams, 0.13mol, obtained from Momentive Performance Materials under the tradename A-Link* 15 silane) was added. The mixture was stirred until the isocyanate content was not detectable.

A coating composition having the components of Table 8 was prepared using the procedure of Example 4.

TABLE 8

The formulation of coating composition using resin prepared in Comp. Ex. B.

| Component | Amounts, grams |
| --- | --- |
| Resin of Comp. Ex. 6 | 217.7 |
| xylene | 213 |
| n-butyl acetate | 26.5 |
| Ti-Pure ® R-103TiO$_2$ (DuPont) | 53 |

The properties of the coating are:
Konig hardness: 23 after 3 days, 39 after 43 days
Initial color: L*=96.84; a*=−0.76; b*=0.07
Color after QUV-B (30 days): L*=96.30; a*=0.2; b*=−0.01; ΔE=1.2
Initial gloss: 20°=4.9; 60°=24.6; 80°=40.5
Gloss after QUV-B (30 days): 20°=1.5; 60°=6.4; 80°=21.2
Viscosity after aging 50° C.:
initial=1.55 Pascal second
3 day=3.40 Pascal second
5 day=8.02 Pascal second
The viscosity increase from1.55 to 8.02 Pascal second after aging only 5 days at 50° C. The coating composition also had low gloss of only 21.2 at an angle of 80°.

Example 7

Preparation of Moisture-Curable Silylated Resin Derived from the Reaction of Polycarbonate Diol Containing 1,6 Hexyl and 1,5 Pentyl Groups, Isophorone Diisocyanate, Isophorone Diisocyanate Trimer and N-ethyl-3-amino-2-methylpropyltrimethoxysilane Into a 500 mL round bottom flask equipped with a mechanical stirrer, dropping funnel, reflux condenser and nitrogen line, were charge polycarbonate diol A (a hydroxyl-terminated polycarbonate containing 45 mole percent 1,6-hexyl groups and 55 mole percent 1,5-pentyl groups, hydroxyl number of 56, equivalent weight of 1001.5 grams/mole, 106.8 grams, 0.053 mol) and n-butyl acetate (55 grams). The mixture was stirred under nitrogen and heated to 90° C. A mixture of isophorone diisocyanate (26.8 grams, 0.12 mole) and isophorone diisocyanate trimer in butyl acetate (69.0 grams, 0.10 mol, obtained from Vencore X Chemical under the tradename Tolonate™ IDT 70B) was added and reacted at 90° C. for 2.5 hours. The viscosity of the intermediate was 5.2 Pascal second. Bis-(3-trimethoxysilylpropyl) amine (119.0 grams, 0.35 mol, obtained from Momentive Performance Materials under the tradename A-1170 silane) was added at 90° C. The reaction mixture underwent an exothermic reaction, heating the mixture to 113° C. The mixture was stirred 1 hour at 90° C. The viscosity of the reaction product was 8.2 Pascal second. Vinyltrimethoxysilane (3.0 grams) was added as a desiccant. The final viscosity was 7.8 Pascal second.

Example 8

Preparation of Moisture-Curable Silylated Resin Derived from the Reaction of Polycarbonate Diol Containing 1,6 Hexyl and 1,5 Pentyl Groups, Isophorone Diisocyanate, Isophorone Diisocyanate Trimer, Trimethylol Propane and 3-isocyanatopropyl-trimethoxysilane Into a 500 mL round bottom flask equipped with a mechanical stirrer, dropping funnel, reflux condenser and nitrogen line, were charge polycarbonate diol A (a hydroxyl-terminated polycarbonate containing 45 mole percent 1,6-hexyl groups and 55 mole percent 1,5-pentyl groups, hydroxyl number of 56, equivalent weight of 1001.5 grams/mole, 162 grams, 0.0581 mol), trimethyol propane (22.5 grams, 0.16 mol) and n-butyl acetate (75 grams). The mixture was stirred under nitrogen and heated to 90° C. Isophorone diisocyanate (30.5 grams, 0.14 mole) was added and reacted at 90° C. for 2.5 hours. The viscosity of the intermediate was 24.9 Pascal second. 3-Isoccyanatopropyltrimethoxysilane (84.6 grams, 0.41 mol, obtained from Momentive Performance Materials under the tradename A-Link 35 silane) was added at 90° C. The mixture was stirred 1.5 hour at 90° C. The viscosity of the reaction product was 831.2 Pascal second. Vinyltrimethoxysilane (3.0 grams) was added as a desiccant. The final viscosity was 34.2 Pascal second.

While the invention has been described above with references to specific embodiments thereof, it is apparent that many changes, modifications and variations can be made without departing from the invention concept disclosed herein. Accordingly, it is intended to embrace all such changes, modifications and variations that fall within the spirit and broad scope of the appended claims.

What is claimed is:

1. A coating, sealant or adhesive composition containing a moisture-curable silylated resin, the moisture-curable silylated resin obtained by a process comprising reacting a silylating agent with at least one of:
   a hydroxyl—terminated polyurethane (VI) derived from the reaction of an organic polyisocyanate and a polycarbonate diol (V); and,
   an isocyanate—terminated polyurethane (VII) derived from the reaction of an organic polyisocyanate and a polycarbonate diol (V), and
   wherein the polycarbonate diol (V) is obtained from the reaction of carbonylating agent and a diol of which at least 80 mole percent is diol selected from the group consisting of:
   (i) a mixture of at least two different acyclic straight chain aliphatic diols each diol possessing up to 20 carbon atoms,
   (ii) at least one acyclic branched chain diol possessing up to 20 carbon atoms, and
   (iii) a mixture of at least one acyclic straight chain aliphatic diol possessing up to 20 carbon atoms and at least one acyclic branched chain aliphatic diol possessing up to 20 carbon atoms;

and wherein the hydroxyl—terminated polyurethane (VI) and the isocyanate—terminated polyurethane (VII) are derived from a mixture of polyisocyanates in which at least one polyisocyanate is an organic polyisocyanate containing two isocyanate groups and at least one other polyisocyanate is an organic polyisocyanate containing three isocyanate groups;

and wherein the moisture-curable silylated resin is combined with ingredients and formulated to result in a coating, sealant or adhesive composition.

2. The coating, sealant or adhesive composition of claim 1, wherein the molar ratio of organic polyisocyanate containing two isocyanate groups and organic polyisocyanate containing three isocyanate groups is from 10:1 to 1:10.

3. The coating, sealant or adhesive composition of claim 1, wherein the silylating agent that is reacted with the hydroxyl-terminated polyurethane (VI) is an isocyanatosilane having the general formula (IX):

(IX)

wherein each $R^1$ is independently an alkyl group of from 1 to 6 carbon atoms, each $R^2$ is independently an alkyl group of from 1 to 4 carbon atoms or phenyl group, $R^3$ is a divalent alkylene group of from 1 to 12 carbon atoms, and a is an integer of from 1 to 3.

4. The coating, sealant or adhesive composition of claim 3, wherein the isocyanatosilane is selected from the group consisting of 1-isocyanatomethyltrimethoxysilane, 2-isocyanatoethyltrimethoxysilane, 3-isocyanatopropyltrimethoxysilane, 1-isocyanatomethyltriethoxysilane, 2-isocyanatoethyltriethoxysilane, 3-isocyanatopropyltriethoxysilane, 1-isocyanatomethylmethyldimethoxysilane, 3-isocyanatopropylmethyldimethoxysilane, 1-isocyantomethylmethyldiethoxysilane, 3-isocyanatopropylmethyldiethoxysilane and mixtures thereof.

5. The coating, sealant or adhesive composition of claim 1, wherein the silylating agent that is reacted with the isocyanate-terminated polyurethane (VII) is an aminosilane having the general formula (X):

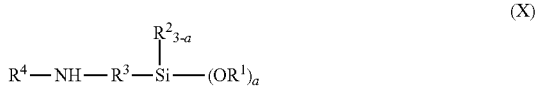
(X)

wherein each $R^1$ is independently an alkyl group of from 1 to 6 carbon atoms, each $R^2$ is independently an alkyl group of from 1 to 4 carbon atoms or phenyl group, $R^3$ is a divalent alkylene group of from 1 to 12 carbon atoms, $R^4$ is an alkyl group of from 1 to 12 carbon atoms, phenyl group, hydrogen or $-R^3SiR^2_{3-a}(OR^1)_a$ group and a is an integer of from 1 to 3.

6. The coating, sealant or adhesive composition of claim 5, wherein the aminosilane is selected from the group consisting 3-aminopropyltrimethoxysilane, 3-aminopropyltriethoxysilane, 4-amino-3,3-dimethylbutyltrimethoxysilane, 4-amino-3,3-dimethylbutyldimethoxymethylsilane, N-methylaminoisobutyltrimethoxysilane, N-ethylaminoisobutyltrimethoxysilane, N-ethyl-3-amino-2-methylpropyldiethoxymethylsilane, N-ethyl-3-amino-2-methylpropyltriethoxy silane, N-ethyl-3-amino-2-methylpropylmethyldimethoxysilane, N-butyl-3-aminopropyltrimethoxysilane, N-butyl-3-amino-2-methylpropyltrimethoxysilane, N-ethyl-4-amino-3,3-dimethylbutyldimethoxymethylsilane and N-ethyl-4-amino-3,3-dimethylbutyltrimethoxysilane, N,N-bis-(3-trimethoxysilylpropyl) amine and combinations thereof.

7. The coating, sealant or adhesive composition of claim 6, wherein the aminosilane is N-ethylaminoisobutyltrimethoxysilane, N-ethyl-4-amino-3,3-dimethylbutyltrimethoxysilane, N-butyl-3-aminopropyltrimethoxysilane or a combination thereof.

8. The coating, sealant or adhesive composition of claim 1 possessing at least one of a number average molecular weight of from 1500 to 10,000, a crystalline content as measured by differential scanning colorimetry of not greater than 1 weight percent crystallinity, based on the total weight of the moisture-curable silylated resin (1), or a viscosity 0.05 to 50 Pascal·second.

9. A substantially water-free coating, sealant or adhesive composition comprising the moisture-curable silylated resin of claim 1, wherein at least one of the ingredients is selected from the group consisting of organoalkoxysilanes, silicone hardcoats, metal particulates, metal oxide particulates, pigments, curing catalysts, leveling agents, antioxidants, UV stabilizers, dyes, fillers, adhesion promoters and solvents.

10. The substantially water-free coating, sealant or adhesive composition of claim 9, wherein the composition is an adhesive.

11. The coating, sealant or adhesive composition containing the moisture-curable silylated resin of claim 1, wherein the polycarbonate diol (V) is obtained from the reaction of carbonylating agent and diol mixture (ii), wherein at least one of the diols possesses an even number of carbon atoms and at least one other diol possesses an odd number of carbon atoms.

* * * * *